United States Patent
Fujise

(10) Patent No.: US 7,099,167 B2
(45) Date of Patent: Aug. 29, 2006

(54) STEP-DOWN CIRCUIT, POWER SUPPLY CIRCUIT, AND SEMICONDUCTOR INTEGRATED CIRCUIT

(75) Inventor: Takashi Fujise, Shiojiri (JP)

(73) Assignee: Seiko Epson Corporation, (JP)

( * ) Notice: Subject to any disclaimer, the term of this patent is extended or adjusted under 35 U.S.C. 154(b) by 216 days.

(21) Appl. No.: 10/719,998

(22) Filed: Nov. 21, 2003

(65) Prior Publication Data

US 2004/0136213 A1   Jul. 15, 2004

(30) Foreign Application Priority Data

Nov. 26, 2002  (JP)  ............... 2002-341618

(51) Int. Cl.
 *H02M 3/07* (2006.01)
(52) U.S. Cl. ...................................... 363/62
(58) Field of Classification Search ................ 323/233, 323/293, 364; 363/59, 60, 62
 See application file for complete search history.

(56) References Cited

U.S. PATENT DOCUMENTS

| | | | | |
|---|---|---|---|---|
| 5,461,557 A | * | 10/1995 | Tamagawa | 363/60 |
| 5,608,614 A | * | 3/1997 | Ohnishi et al. | 363/60 |
| 5,625,544 A | * | 4/1997 | Kowshik et al. | 363/59 |
| 6,642,773 B1 | * | 11/2003 | Lin et al. | 327/536 |
| 6,661,683 B1 | * | 12/2003 | Botker et al. | 363/60 |
| 6,891,427 B1 | | 5/2005 | Tsutsui et al. | 327/537 |
| 6,922,097 B1 | * | 7/2005 | Chan et al. | 327/536 |

FOREIGN PATENT DOCUMENTS

| | | |
|---|---|---|
| CN | 1325099 | 5/2001 |
| JP | 02-193566 | 7/1990 |
| JP | 2000-020147 | 1/2000 |
| JP | 2000-236657 | 8/2000 |
| JP | 2000-278937 | 10/2000 |
| JP | 2000-297107 | 10/2000 |
| JP | 2001-211635 | 8/2001 |
| JP | 2001-268894 | 9/2001 |
| JP | 2001-337653 | 12/2001 |
| JP | 2001-339939 | 12/2001 |
| JP | 2002-062858 | 2/2002 |

* cited by examiner

*Primary Examiner*—Jeffrey Sterrett
(74) *Attorney, Agent, or Firm*—Harness, Dickey & Pierce, P.L.C.

(57) ABSTRACT

A step-down circuit is provided that comprises a clock control circuit which provides a plurality of clock signals having a frequency determined based on a control signal; a charge pump circuit which reduces a first potential applied to a first terminal and then provides a second potential from a second terminal by switching the connection of a plurality of capacitors in sync with a plurality of the clock signals output from the clock control circuit; and a comparator which produces the control signal to be supplied to the clock control circuit by comparing the second potential to a reference potential.

8 Claims, 5 Drawing Sheets

STEP-DOWN CIRCUIT, POWER SUPPLY CIRCUIT, AND SEMICONDUCTOR INTEGRATED CIRCUIT

BACKGROUND OF THE INVENTION

1. Field of the Invention

The present invention relates to a charge pump step-down circuit which reduces and provides an applied potential, and a power supply circuit which produces a plurality of power supply potentials using the charge pump step-down circuit. The invention also relates to a semiconductor integrated circuit (a liquid crystal display driver) including the step-down circuit or the power supply circuit and a method of driving a liquid crystal display.

2. Related Art

FIG. 4 is a schematic diagram showing a conventional charge pump ½ step-down circuit. This circuit halves a first potential V1 and provides a second potential V2. As shown in FIG. 4, the circuit includes P-channel MOS transistors Q1 and Q2 and N-channel MOS transistors Q3 and Q4 connected in series between the first potential V1 and a power supply potential $V_{SS}$ (referred to here as a ground potential) on the low potential side. The circuit also includes a capacitor C1 connected to a point between a connection point of the transistors Q1 with Q2 and a connection point of the transistors Q3 with Q4, a capacitor C2 connected to a point between the first potential V1 and the second potential V2, and a capacitor C3 connected to a point between the second potential V2 and the ground potential $V_{SS}$. Here, the capacity of the capacitor C2 is equivalent to that of the capacitor C3.

To gates of the transistors Q1 to Q4, clock signals CKA to CKD, respectively, with wave patterns shown in FIG. 5 are applied. FIG. 6(a) shows an equivalent circuit of the step-down circuit during a period of T1 shown in FIG. 5, while FIG. 6(b) shows an equivalent circuit of the step-down circuit during a period of T2 in FIG. 5.

During the period T1, as shown in FIG. 6(a), the capacitor C2 and the capacitors (C1+C3) are connected in series between the first potential V1 and the ground potential $V_{SS}$. With both capacitors being charged, the first potential V1 is divided into the ratio of the capacitor (C1+C3) with the capacitor C2. Then during the period T2, as shown in FIG. 6(b) the capacitors (C1+C2) and the capacitor C3 are connected in series between the first potential V1 and the ground potential $V_{SS}$. With both capacitors being charged, the first potential V1 is divided into the ratio of capacitor C3 with the capacitors (C1+C2). As a result of switching the periods T1 and T2 repeatedly, a voltage that is about half as large as the first potential V1 is maintained at both ends of the capacitor C2. Consequently, the charge pump step-down circuit does not need to pass a direct current loss, and thereby it provides extremely high efficiency.

The charge pump step-down circuit, however, merely forwards electrical charges stored in capacitors. Therefore, it has a problem in that an output voltage is considerably lowered when trying to pull out as large a current as possible.

Meanwhile, an LCD driver includes a power supply circuit that produces some kinds of power supply potentials based on a stabilized power supply potential so as to produce potentials in accordance with input image data and to output them to LCD electrodes. FIG. 7 shows such a conventional power supply circuit. Since this power supply circuit employs a voltage divider including resistors and a voltage buffer including operational amplifiers, it has a problem in that the operational amplifiers, in particular, deliver a direct current loss, which results in high power consumption.

In consideration of the above-mentioned problems, the invention aims to (1) provide a stable potential regardless of variations in a load with a charge pump step-down circuit, (2) reduce a direct current loss of a power supply circuit that produces some kinds of power supply potentials based on an input potential, and thereby lower power consumption, and (3) provide a semiconductor integrated circuit that puts such a step-down circuit or a power supply circuit into practice.

SUMMARY

In order to solve the above problems, a step-down circuit according to the invention comprises a clock control circuit which provides a plurality of clock signals having a frequency determined based on a control signal; a charge pump circuit which reduces a first potential applied to a first terminal and then provides a second potential from a second terminal by switching the connection of a plurality of capacitors in sync with a plurality of the clock signals output from the clock control circuit; and a comparator which produces the control signal to be supplied to the clock control circuit by comparing the second potential to a reference potential.

The step-down circuit may further comprise a reference potential generating circuit which produces a reference potential based on the first potential applied to the first terminal of the charge pump circuit. Moreover, the clock control circuit may further include a frequency divider which divides an input clock signal; a selection circuit which selects, based on the control signal provided by the comparator, either the input clock signal or a clock signal divided by the frequency divider; and an output circuit which provides a plurality of the clock signals to be provided to the charge pump circuit based on the clock signal selected by the selection circuit.

The step-down circuit according to the invention varies the frequency of the clock signal provided to the charge pump circuit by comparing an output potential to the reference potential, and thereby provides a stable potential regardless of load.

A power supply circuit according to the invention provides a plurality of potentials from a plurality of terminals based on the first potential. The power supply circuit comprises a voltage divider which divides the first potential, a voltage follower which provides the second potential based on the potential divided by the voltage divider, and a step-down circuit which reduces the first or the second potential and then provides a third potential by switching the connection of a plurality of capacitors in sync with a clock signal.

The power supply circuit may further comprise a booster which increases the first potential and then provides a fourth potential; a second voltage divider which divides the fourth potential; a second voltage follower_which provides a fifth potential based on the potential divided by the second voltage divider; and a second step-down circuit which, by switching the connection of a plurality of capacitors in sync with a clock signal, reduces the fourth or the fifth potential and then provides a sixth potential. Moreover, the power supply circuit may further comprise a stabilized power supply circuit which produces a stabilized power supply potential, and an operational amplifier which produces the first potential by amplifying the stabilized power supply potential produced by the stabilized power supply circuit with a certain amplification factor.

The power supply circuit according to the invention provides part of the power supply potentials through charge pump step-down circuits, and thereby reduces a direct current loss and lowers power consumption compared to a power supply circuit that provides all power supply potentials through voltage followers.

A semiconductor integrated circuit according to the invention comprises either the step-down circuit or the power supply circuit described above.

DETAILED DESCRIPTION

Figure 1:
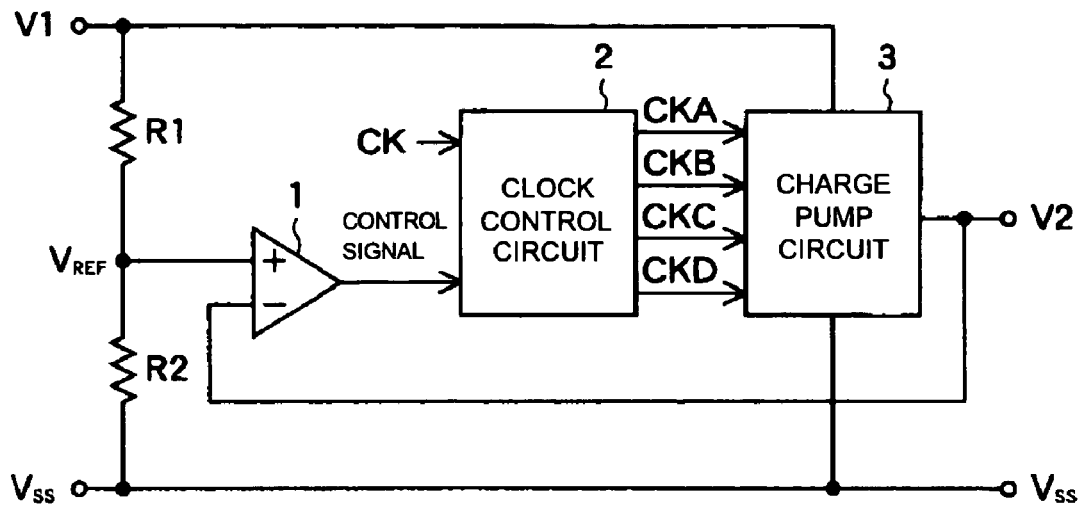
FIG. 1 is a schematic diagram showing the step-down circuit included in the semiconductor integrated circuit according to the first embodiment of the invention.

Embodiments of the invention are described below in detail with reference to the accompanying drawings. In the embodiments, identical elements are given the same reference numerals, and their repeated descriptions are omitted.

FIG. 1 is a schematic diagram showing a step-down circuit included in a semiconductor integrated circuit according to a first embodiment of the invention. The step-down circuit shown in FIG. 1 comprises a clock control circuit 2 which provides a plurality of clock signals CKA to CKD having a frequency determined based on a control signal, a charge pump circuit 3 which reduces a first potential V1 applied to an input terminal and then provides a second potential V2 from an output terminal by switching the connection of a plurality of capacitors in sync with a plurality of the clock signals CKA to CKD output from the clock control circuit 2, and a comparator 1 which produces the control signal to be supplied to the clock control circuit 2 by comparing the second potential V2 to a reference potential $V_{REF}$.

Here, the reference potential $V_{REF}$ is produced by dividing a voltage between the first potential V1 and a power supply potential (referred to as a ground potential in this embodiment) $V_{SS}$ on the low potential side using resistors R1 and R2. In a case with a ½ step-down circuit, the values of the resistors R1 and R2 are set to be equal.

Figure 2:
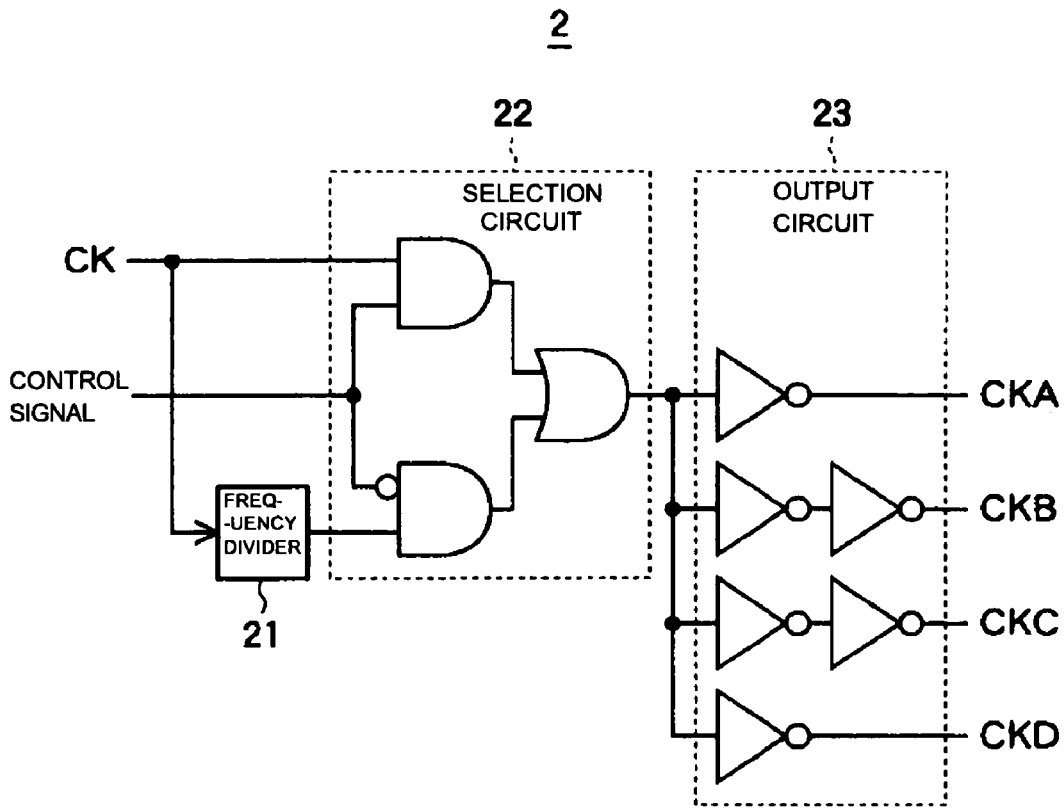
FIG. 2 is a schematic diagram showing the clock control circuit in FIG. 1.

FIG. 2 is a schematic diagram showing the clock control circuit in FIG. 1. As FIG. 2 shows, the clock control circuit 2 comprises a frequency divider 21 which divides an input clock signal CK; a selection circuit 22 which selects, based on the control signal provided by the comparator, either the input clock signal CK or a clock signal divided by the frequency divider 21; and an output circuit 23 which provides a plurality of the clock signals CKA to CKD to be provided to the charge pump circuit based on the clock signal selected by the selection circuit 22. The selection circuit 22, for example, comprises a plurality of "AND" circuits and "OR" circuits. The output circuit 23, for example, comprises a plurality of inverters.

Figure 4:
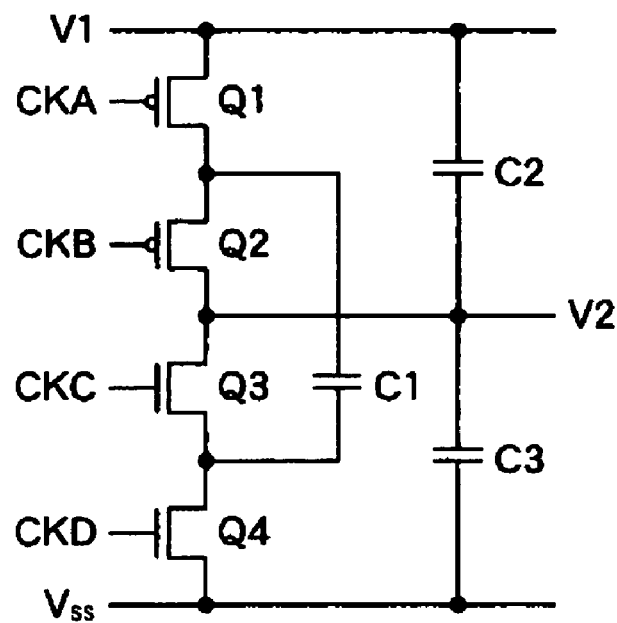
FIG. 4 is a schematic diagram showing a conventional charge pump step-down circuit.
Figure 5:
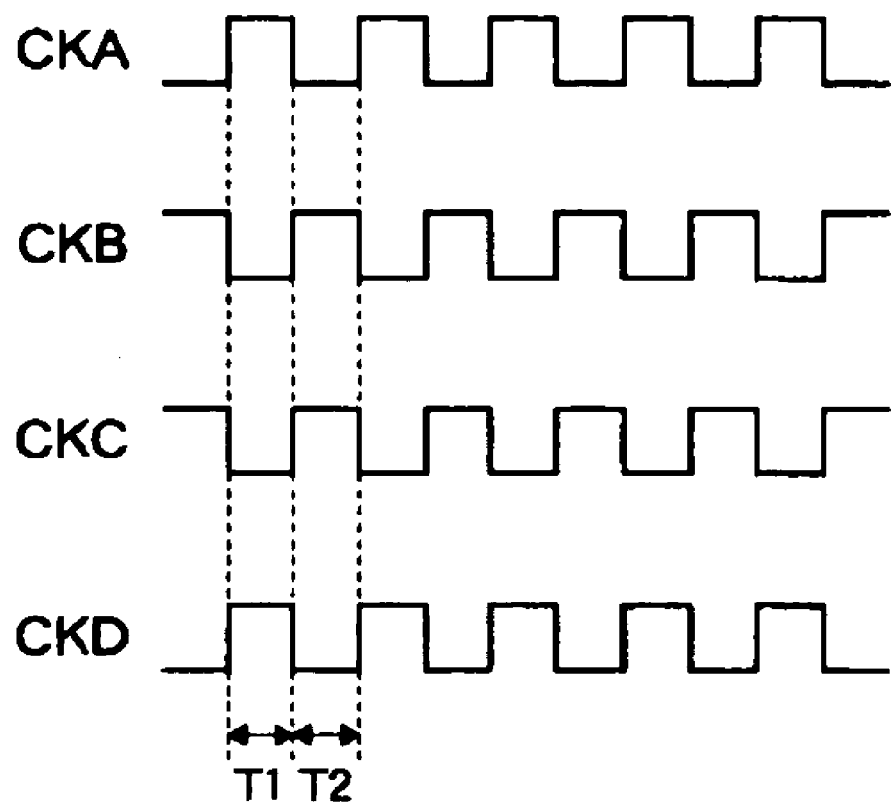
FIG. 5 is a diagram showing the wave patterns of the clock signals used in the step-down circuit shown in FIG. 4.
Figure 6:
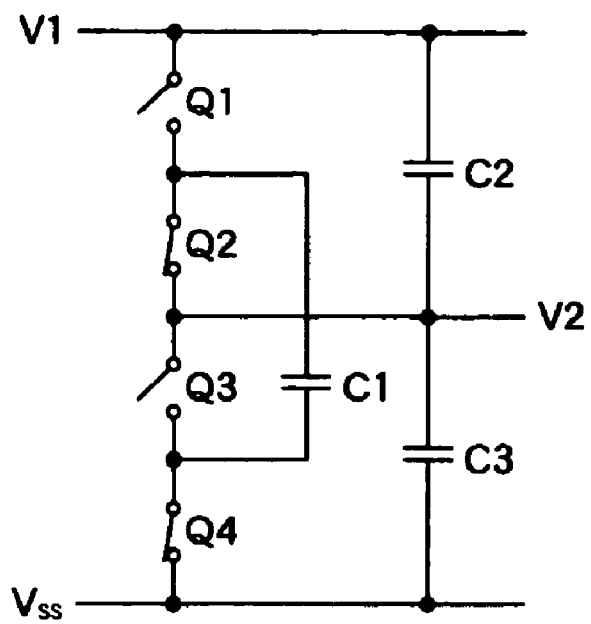
FIG. 6 is a diagram showing an equivalent circuit of the step-down circuit shown in FIG. 4.
Figure 6:
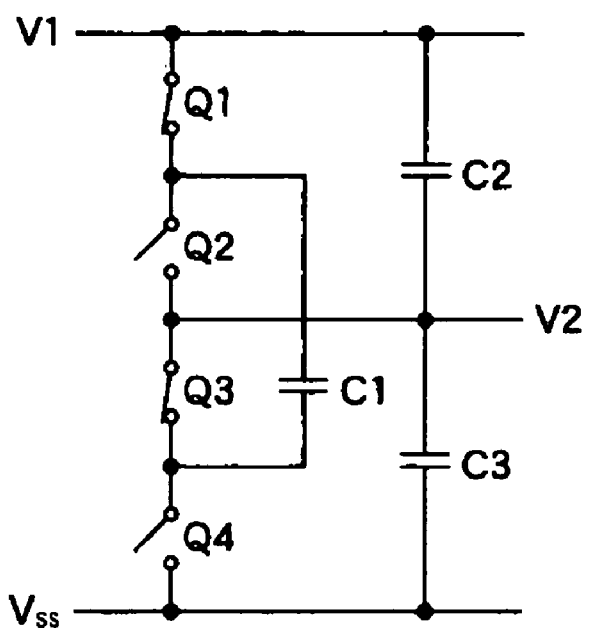
Figure 7:
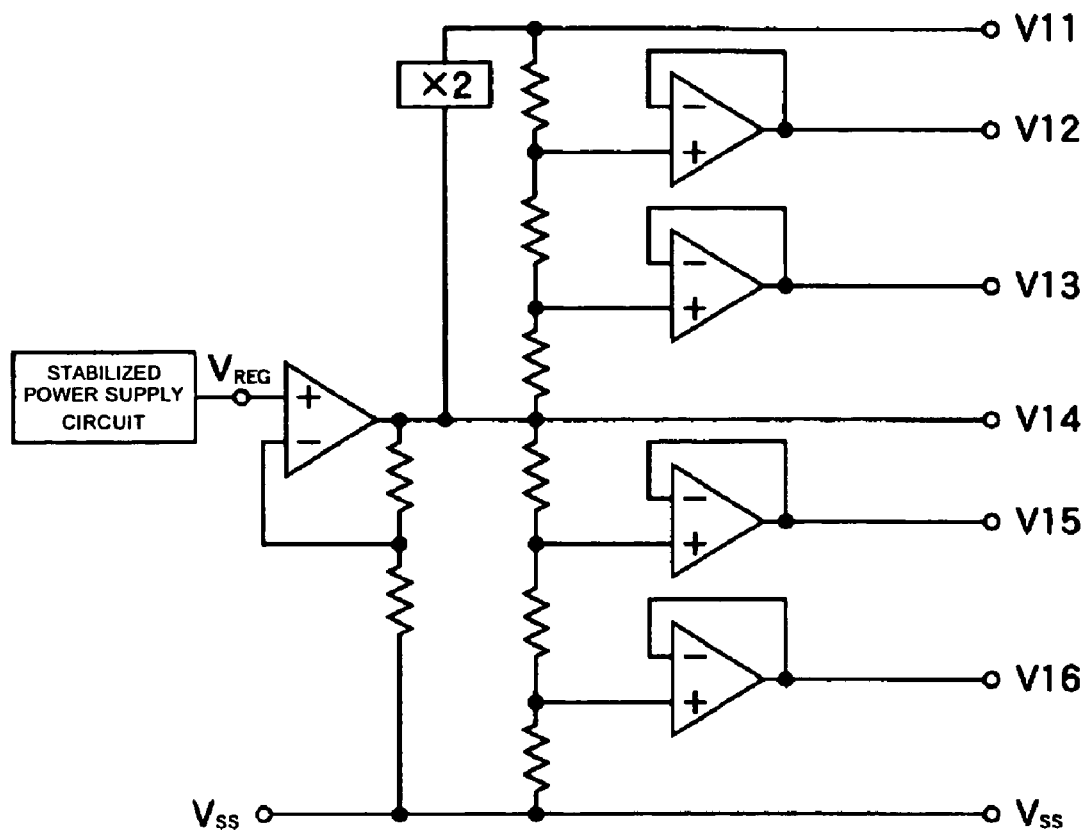
FIG. 7 shows a conventional power supply circuit.

The charge pump circuit 3 employs such a circuit as shown in FIG. 4. At the same time, an operational amplifier can be used as the comparator 1, which may have hysteresis characteristics. If the second potential V2 output from the charge pump circuit 3 is higher than the reference potential $V_{REF}$, the control signal output from the comparator 1 is set to a low level, and the selection circuit 22 included in the clock control circuit 2 selects the clock signal divided by the frequency divider.

Here, when a load is connected to the charge pump circuit 3 for pulling out a large current, the charge pump circuit 3 fails to sufficiently deliver electrical charges out of its capacitors in a specific period, which lowers the second potential V2 output from its terminal. If the second potential V2 becomes lower than the reference potential $V_{REF}$, the control signal output from the comparator 1 is set to a high level, and the selection circuit 22 in the clock control circuit 2 selects the input clock signal CK whose frequency is higher than that of the divided clock signal. Consequently, a switching frequency of the charge pump circuit 3 is thereby increased and its capacitors are successfully charged at short enough intervals. Therefore, the output potential V2 is prevented from being lowered, which makes it more consistent with a preset value of a half of the first potential V1.

Next a second embodiment of the invention is described below.

Figure 3:
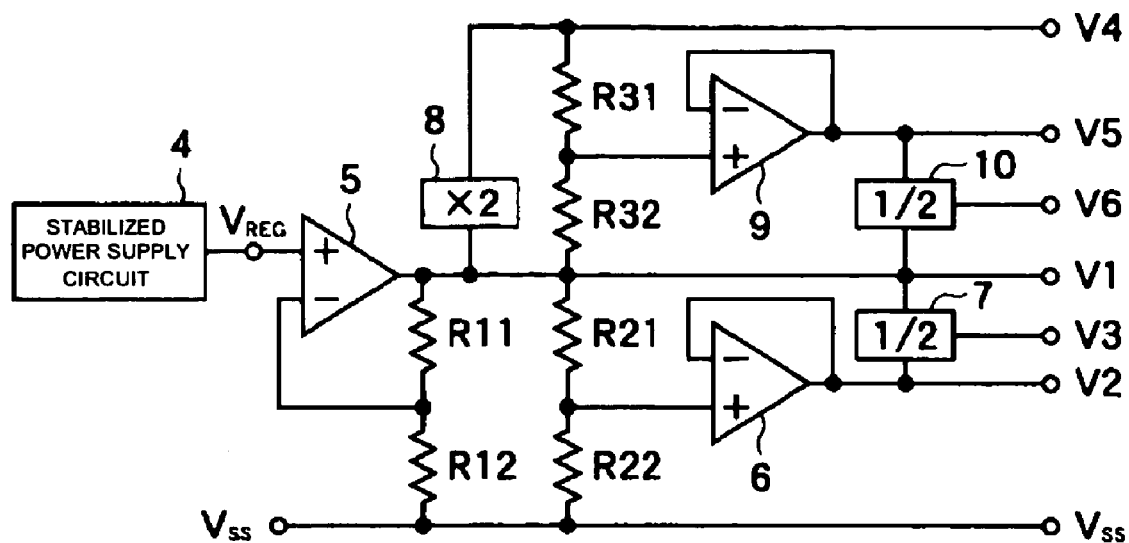
FIG. 3 is a schematic diagram showing the power supply circuit included in the semiconductor integrated circuit according to the second embodiment of the invention.

FIG. 3 is a schematic diagram showing a power supply circuit included in a semiconductor integrated circuit according to the second embodiment of the invention. The power supply circuit shown in FIG. 3 provides a plurality of potentials V1 to V6 from a plurality of terminals based on a first potential V1 output from an operational amplifier 5.

The power supply circuit comprises a stabilized power supply circuit 4 which produces a stabilized power supply potential $V_{REG}$, and an operational amplifier 5 which produces a first potential V1 by amplifying the stabilized power supply potential $V_{REG}$ with a predetermined amplification factor. The power supply circuit also comprises resistors R21 and R22 which divide the first potential V1, an operational amplifier 6 which provides a second potential V2 based on the potential divided by the resistors R21 and R22, and a step-down circuit 7 which halves the first potential V1 with respect to the second potential V2 so as to provide a third potential V3. The step-down circuit 7 may reduce the second potential V2 with respect to a power supply potential (referred to as a ground potential in this embodiment) $V_{SS}$ on the low potential side.

The power supply circuit further comprises a booster 8 which doubles the first potential V1 and then provides a fourth potential V4, resistors R31 and R32 which divide the fourth potential V4, an operational amplifier 9 which provides a fifth potential V5 based on the potential divided by the resistors R31 and R32, and a step-down circuit 10 which halves the fifth potential V5 with respect to the first potential V1 and then provides a sixth potential V6. The step-down circuit 10 may halve the fourth potential V4 with respect to the fifth potential V5.

The operational amplifier 5 produces the first potential V1 by amplifying the stabilized power supply potential $V_{REG}$ with an amplification factor determined by the values of the resistors R11 and R12. The operational amplifier 6 comprises a voltage follower with a 100% feedback, and provides the potential divided by the resistors R21 and R22 with low impedance. Although the step-down circuit 7 may employ a step-down circuit such as that shown in FIG. 4, preferably it is a step-down circuit such as that shown in FIG. 1. The step-down circuit 7 halves a potential by switching the connection of a plurality of capacitors in sync with clock signals.

A charge pump forward booster can be used as the booster 8. The operational amplifier 9 comprises a voltage follower with a 100% feedback, and provides the potential divided by the resistors R31 and R32 with low impedance. Although the step-down circuit 10 may employ a step-down circuit such as that shown in FIG. 4, preferably it is a step-down circuit such as that shown in FIG. 1. The step-down circuit 10 halves a potential by switching the connection of a plurality of capacitors in sync with clock signals.

In this manner, the combination of the two voltage followers and the two ½ step-down circuits produces the second potential V2, the third potential V3, the fifth potential V5, and the sixth potential V6, all based on the first potential V1 and the fourth potential V4 (=2*V1) which are provided. They satisfy, for example, the following formulas:

$$V2=\tfrac{1}{3}*V1;$$

$$V3=\tfrac{2}{3}*V1;$$

$$V5=V1+\tfrac{2}{3}*(V4-V1)=\tfrac{5}{3}*V1; \text{ and}$$

$$V6=V1+\tfrac{1}{3}*(V4-V1)=\tfrac{4}{3}*V1.$$

As described above, the step-down circuit according to the invention provides a stable potential regardless of variations in a load by varying the frequency of clock signals provided to the charge pump circuit based on a comparison between an output potential and the reference potential. At the same time, the power supply circuit according to the invention provides part of the power supply potentials through charge pump step-down circuits, and thereby reduces a direct current loss and lowers power consumption compared to a power supply circuit that provides all power supply potentials through voltage followers.

The entire disclosure of Japanese Patent Application No. 2002-341618 filed Nov. 26, 2002 is incorporated by reference.

What is claimed is:

1. A step-down circuit, comprising:
a clock control circuit which provides a plurality of clock signals having a frequency determined based on a control signal;
a charge pump circuit which reduces a first potential applied to a first terminal so as to provide a second potential from a second terminal by switching a connection of a plurality of capacitors in sync with the plurality of clock signals output from the clock control circuit;
a comparator which produces the control signal supplied to the clock control circuit by comparing the second potential to a reference potential;
a frequency divider which divides an input clock signal;
a selection circuit which selects one of the input clock signal and a clock signal divided by the frequency divider, based on the control signal provided by the comparator; and
an output circuit which provides the plurality of clock signals to be provided to the charge pump circuit based on the one clock signal selected by the selection circuit.

2. The step-down circuit according to claim 1, further comprising:
a circuit which generates the reference potential based on the first potential applied to the first terminal of the charge pump circuit.

3. The step-down circuit according to claim 1 wherein the step-down circuit is included on a semiconductor integrated circuit.

4. A power supply circuit providing a plurality of potentials from a plurality of terminals based on a first potential, comprising:
a voltage divider which divides the first potential;
a voltage follower which provides a second potential based on the first potential divided by the voltage divider; and
a step-down circuit which reduces at least one of the first potential and the second potential so as to provide a third potential by switching a connection of a plurality of capacitors in sync with a clock signal.

5. The power supply circuit according to claim 4, further comprising:
a booster which increases the first potential so as to provide a fourth potential;
a second voltage divider which divides the fourth potential;
a second voltage follower which provides a fifth potential based on the divided fourth potential; and
a second step-down circuit which reduces at least one of the fourth potential and the fifth potential so as to provide a sixth potential, by switching a connection of a second plurality of capacitors in sync with a clock signal.

6. The power supply circuit according to claim 5, further comprising:
a stabilized power supply circuit which produces a stabilized power supply potential; and
an operational amplifier which produces the first potential by amplifying the stabilized power supply potential produced by the stabilized power supply circuit with a predetermined amplification factor.

7. The power supply circuit according to claim 4, further comprising:
a stabilized power supply circuit which produces a stabilized power supply potential; and
an operational amplifier which produces the first potential by amplifying the stabilized power supply potential produced by the stabilized power supply circuit with a predetermined amplification factor.

8. The power supply circuit according to claim 4 wherein the power supply circuit is included on a semiconductor integrated circuit.

* * * * *